US009733487B2

(12) United States Patent
Ly et al.

(10) Patent No.: US 9,733,487 B2
(45) Date of Patent: Aug. 15, 2017

(54) RETAINING DEVICE (71) Applicants: Pinna Ly, Glendale Heights, IL (US); Rebecca S. Tecson, Glendale Heights, IL (US)

(72) Inventors: Pinna Ly, Glendale Heights, IL (US); Rebecca S. Tecson, Glendale Heights, IL (US)

( * ) Notice: Subject to any disclaimer, the term of this patent is extended or adjusted under 35 U.S.C. 154(b) by 0 days.

(21) Appl. No.: 14/560,823

(22) Filed: Dec. 4, 2014

(65) Prior Publication Data
US 2016/0161759 A1    Jun. 9, 2016

(51) Int. Cl.
G02C 5/14    (2006.01)
G02C 11/00   (2006.01)

(52) U.S. Cl.
CPC .............. G02C 5/143 (2013.01); G02C 11/00 (2013.01)

(58) Field of Classification Search
CPC .......... G02C 5/143; G02C 1/00; G02C 3/003; G02C 11/00; G02C 9/04; G02C 3/006; G02C 11/02; G02C 5/122
USPC .... 351/121–123, 153, 157, 156, 41, 111, 52
See application file for complete search history.

(56) References Cited

U.S. PATENT DOCUMENTS

| | | | | |
|---|---|---|---|---|
| 2,229,568 A * | 1/1941 | Hodgkins | ............... | G02C 5/143 351/123 |
| 3,582,194 A * | 6/1971 | Liautaud | ................ | G02C 3/003 16/228 |
| 3,953,114 A * | 4/1976 | Bidgood | ................ | G02C 11/00 351/123 |
| 4,204,749 A * | 5/1980 | Davis | ..................... | G02C 11/00 351/123 |
| 4,696,556 A * | 9/1987 | Perry, III | ............... | G02C 11/00 351/123 |
| 5,422,685 A * | 6/1995 | Conway | .................. | G02C 3/003 351/111 |
| 6,017,120 A * | 1/2000 | McCormick | ............. | G02C 3/04 351/111 |
| 6,120,146 A * | 9/2000 | Harris | ..................... | G02C 11/00 351/121 |
| 6,565,208 B1 * | 5/2003 | Lee | ........................ | G02C 11/00 351/122 |
| 2005/0168680 A1 | 8/2005 | Yoshida et al. | | |
| 2009/0244475 A1 * | 10/2009 | Shiue | ...................... | A61F 9/027 351/43 |

(Continued)

FOREIGN PATENT DOCUMENTS

FR    2702057 A1 *    9/1994    ............. G02C 5/143

*Primary Examiner* — Ricky Mack
*Assistant Examiner* — Daniele Manikeu
(74) *Attorney, Agent, or Firm* — Ariel S. Bentolila; Bay Area IP Group LLC (57) ABSTRACT A retaining device joins with a frame from a pair of eyeglasses to securely retain the eyeglasses to the ears and head. The device is a unitary piece having no fasteners or moving parts, such that the device easily attaches and detaches to the frame. The device includes an arm portion that joins with an arm from the frame. The arm portion includes a front end disposed towards the glasses, and a rear end disposed towards the ears. The arm portion includes a slot that is configured to receive the arm section of the frame. The arm may slide or frictionally snap into the slot. An extension portion extends from the arm portion to partially wrap around the ears, retaining the frame on the ears during rigorous physical activity and while sweating around the ears.

19 Claims, 4 Drawing Sheets

(56) References Cited

U.S. PATENT DOCUMENTS

2012/0002157 A1   1/2012  Walters
2012/0224134 A1*  9/2012  Muller .................. G02C 11/00
                                                         351/43

* cited by examiner

RETAINING DEVICE

CROSS-REFERENCE TO RELATED APPLICATIONS

Not applicable.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to a retaining device that helps retain eyeglasses on a body part. More particularly, the invention relates to a retaining device that joins with a frame from eyeglasses and wraps around the ears to help secure the eyeglasses during use.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that eyeglasses are frames bearing lenses worn in front of the eyes. They are normally used for vision correction or eye protection.

Typically, there are several types of glasses for various functions. Safety glasses are a kind of eye protection against flying debris or against visible and near visible light or radiation. Sunglasses allow better vision in bright daylight, and may protect eyes against damage from high levels of ultraviolet light. Specialized glasses may be used for viewing specific visual information, such as stereoscopy. Sometimes glasses are worn simply for aesthetic or fashion purposes.

Typically, sports eyewear are used for physical activities, such as sports and adventures. These glasses fasten around the head and ears. The sports glasses can easily be misaligned or knocked off due to the violent movements of the head and sweat that accompany such activities.

Often, the frames of glasses extend from the lenses to the ears. The frames are made of a cellulose acetate or other semi rigid polymer conducive for flexing along the periphery of the ears. However, the frame section at the ears has a propensity to slide off and misalign the rest of the glasses.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A and 1B illustrate views of an exemplary retaining device, where FIG. 1A illustrates a top perspective view of a pair of retaining devices.

FIGS. 2A and 2B illustrate views of exemplary retaining devices joined with an exemplary frame on eyeglasses, where FIG. 2A illustrates a top perspective view, FIGS. 3A and 3B illustrate detailed perspective views of an exemplary extension portion partially wrapped around an ear to support the frames of eyeglasses, where FIG. 3A illustrates the ear pulled back to reveal the extension portion.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

There are various types of a retaining device for eyeglasses that may be provided by preferred embodiments of the present invention. In one embodiment of the present invention, the retaining device may join with a frame from a pair of eyeglasses to securely retain the eyeglasses to a body part, such as the ears and the head. The device receives the frame form an arm portion and at least partially wraps around the ears from an extension portion. In this manner, the frame is retained on the ears and head, and discomfort from repetitively adjusting the frame into proper alignment on the face may be minimized.

In some embodiments, the device may include a unitary piece having no fasteners or moving parts, such that the device easily attaches and detaches to the frame through a sliding or frictional snapping fastening means. This attachment means allow the device to be utilized on variously sized and dimensioned frames for glasses. The device retains the frame on the ears even during extreme physical activity and sweating around the ears. In use, a pair of devices can be used to join with a pair of arms on the frame.

In some embodiments, the retaining device may include an arm portion that joins with an arm on a frame. The arm portion may include a front end disposed towards the glasses, and a rear end disposed towards the ears. The arm portion may include a slot that is configured to receive the arm section of the frame. In some embodiments, the arm may slide or frictionally snap into the slot. The width of the slot may be forcibly widened to receive larger regions of the frame, and then return to a natural smaller width to create a snug fit with the arm. The slot comprises a grip, such as a section of rubber that grips the arm so that the arm does not slide along the slot while joined thereto.

In some embodiments, the retaining device may further include an extension portion that extends from the rear end of the arm portion. The extension portion is adapted to fit against the ear by partially wrapping around the ear. The extension portion is sufficiently limited in length, such that it is not easily visible while the device is joined with the frame. The extension portion may be configured to enable adornments to attach thereto.

Figure 1A:
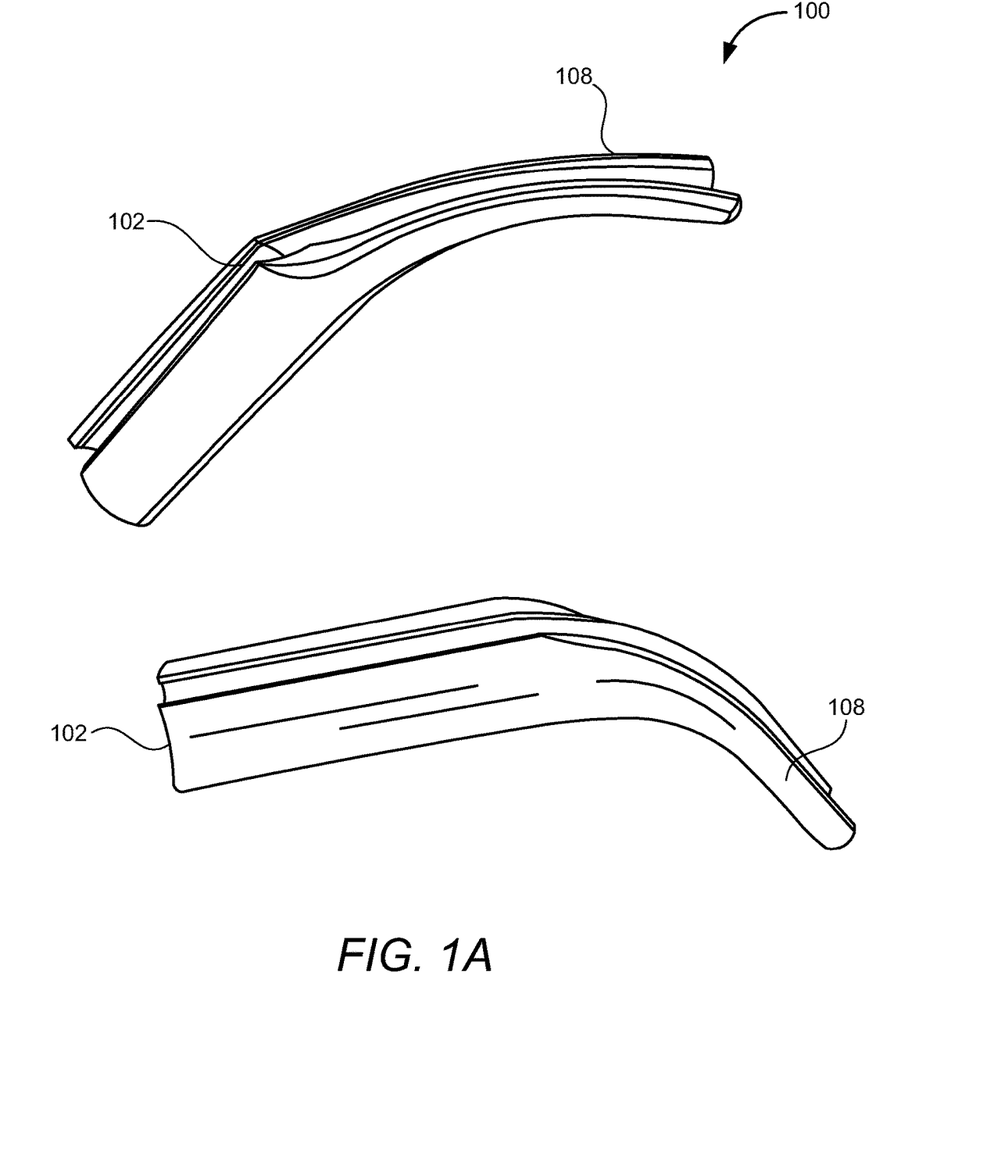
Figure 1B:
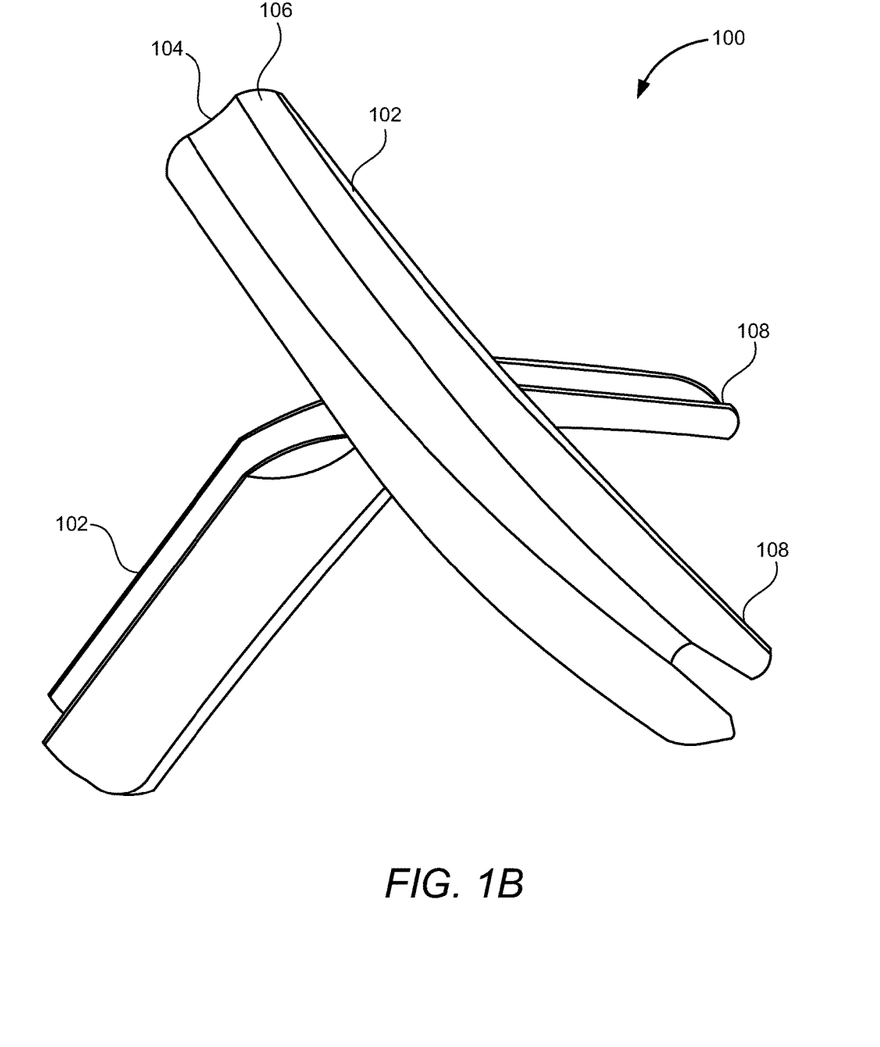
FIG. 1B illustrates a close up view of an exemplary slot and grip on an exemplary arm portion, in accordance with an embodiment of the present invention.

FIGS. 1A and 1B illustrate views of an exemplary retaining device, where FIG. 1A illustrates a top perspective view of a pair of retaining devices, and FIG. 1B illustrates a close up view of an exemplary slot and grip on an exemplary arm portion, in accordance with an embodiment of the present invention. In the present invention, a retaining device 100 helps retain a pair of glasses onto a body part of a user. The body part may include, without limitation, the ears, the face, the temple, and the crown.

In some embodiments, the device may join with a frame from the pair of glasses to securely retain the glasses to the ears by at least partially wrapping around the ears and creating a frictional engagement with the skin around the ears. In this manner, discomfort from repetitively adjusting glasses into proper alignment on the face may minimized. Those skilled in the art will recognize that the device may be effective in helping to prevent eyeglasses from slipping off the face and ears during physical activity. The device may also help adjust the frames on the ears when the frames are too long or short, or when the ears are uneven. Suitable materials for the device may include, without limitation, cellulose acetate, cellulose propionate, hypoallergenic optyl, rigid polymers, metal alloys, and fiberglass.

In some embodiments, the device comprises an arm portion 102 that receives a pair of arms from the frame through a slot 104. The slot may include a grip 106 to help secure the frame thereto. An extension portion 108 may extend from the arm portion and at least partially wraps around the body part to secure both the device and the frame to the body part. The device may include a unitary piece having no fasteners or moving parts. The arm portion 102 may comprise a sectioned cylindrical shape that forms the slot 104.

Those skilled in the art, in light of the present teachings, will recognize that the lack of separate, moving components creates an easy to use, simple device that attaches to a variety of frames. In some embodiments, the device may easily attach and detach to the frame through a sliding or frictional snapping fastening means. This attachment means allow the device to be utilized on variously sized and dimensioned frames for glasses. The device retains the frame on the ears even during extreme physical activity and sweating around the ears.

Figure 2A:
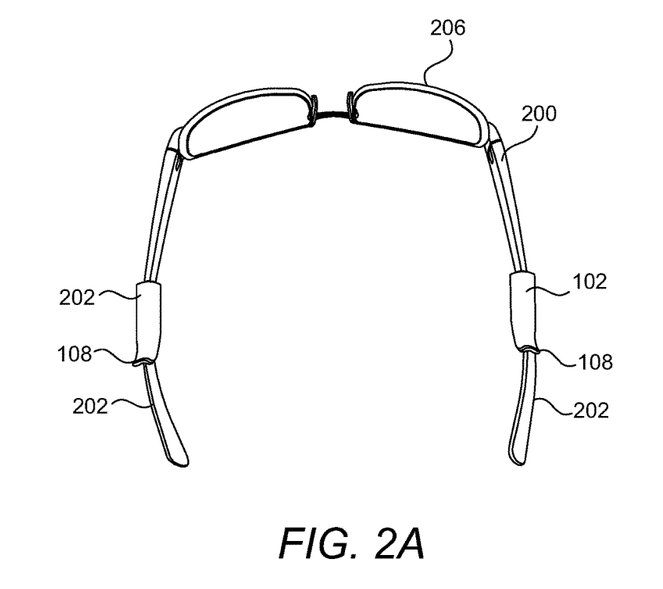
Figure 2B:
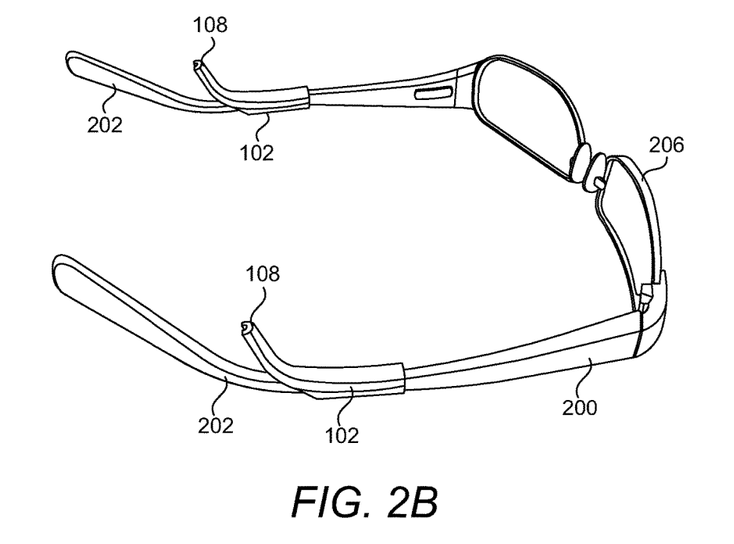
FIG. 2B illustrates a bottom perspective view, in accordance with an embodiment of the present invention.

FIGS. 2A and 2B illustrate views of exemplary retaining devices joined with an exemplary frame on eyeglasses, where FIG. 2A illustrates a top perspective view, and FIG. 2B illustrates a bottom perspective view, in accordance with an embodiment of the present invention. In the present invention, the retaining device 100 may include an arm portion 102 that joins with an arm 202 on a frame 200. The arm portion 102 may include a front end disposed towards the glasses 206, and a rear end disposed towards the ears. The arm portion 102 may include a slot 104 that is configured to receive the arm 202 section of the frame 200. In some embodiments, the arm 202 may slide or frictionally snap into the slot 104. The width of the slot 104 may be forcibly widened to receive larger regions of the frame 200, and then return to a natural smaller width to create a snug fit with the arm 202. The slot 104 comprises a grip 106, such as a section of rubber that grips the arm 202 so that the arm 202 does not slide along the slot 104 while joined thereto.

Figure 3A:
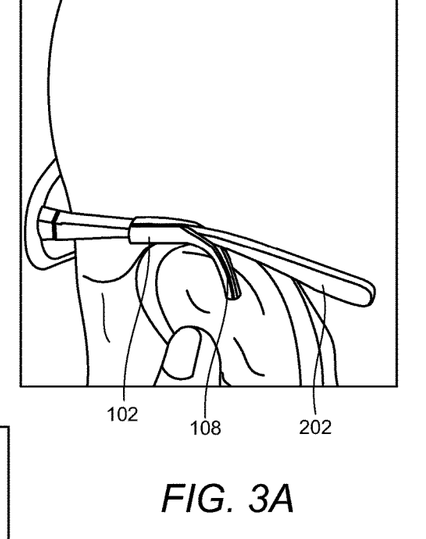
Figure 3B:
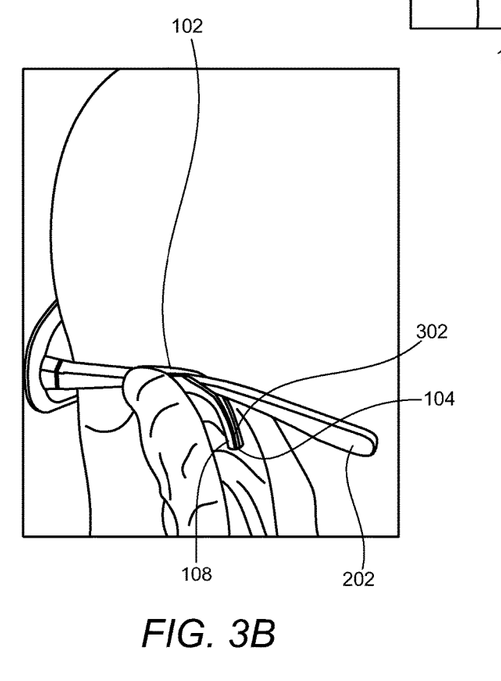
FIG. 3B illustrates the ear in a natural position, in accordance with an embodiment of the present invention.

FIGS. 3A and 3B illustrate detailed perspective views of an exemplary extension portion partially wrapped around an ear to support the frames of eyeglasses, where FIG. 3A illustrates the ear pulled back to reveal the extension portion, and FIG. 3B illustrates the ear in a natural position, in accordance with an embodiment of the present invention. In the present invention, the retaining device may further include an extension portion that extends from the rear end of the arm portion. The extension portion may be adapted to fit against the ear by partially wrapping around the ear. In some embodiments, the extension portion may be sufficiently flexible to wrap around the ears. The extension portion is sufficiently limited in length, such that it is not easily visible while the device is joined with the frame. The extension portion comprises a hook portion 302, which may be configured to enable adornments, such as beads to be joined thereto.

In one alternative embodiment, the extension portion includes a pair of free ends that fasten together to secure the frame to the ears. In yet another alternative embodiment, the slot comprises an adhesive to fasten the pair of arms thereto. In yet another alternative embodiment, the ends of the extension portion include jewelry to provide adornment.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC §112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC §112 (6).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §112 (1), all claims must be supported by sufficient disclosure in the present patent specification, and any material known to those skilled in the art need not be explicitly disclosed. However, 35 USC §112 (6) requires that structures corresponding to functional limitations interpreted under 35 USC §112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112 (6) when such corresponding structures are not explicitly disclosed in the foregoing patent specification. Therefore, for any invention element(s)/structure(s) corresponding to functional claim limitation(s), in the below claims interpreted under 35 USC §112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC §112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC §112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC §112 (6). Applicant(s) note that all the identified documents above which are incorporated by reference to satisfy 35 USC §112 (6) necessarily have a filing and/or publication date prior to that of the instant application, and thus are valid prior documents to incorporated by reference in the instant application.

Having fully described at least one embodiment of the present invention, other equivalent or alternative methods of implementing a retaining device that helps retain eyeglasses on a body part. More particularly, the invention relates to retaining device that helps retain eyeglasses on a body part according to the present invention will be apparent to those skilled in the art. Various aspects of the invention have been described above by way of illustration, and the specific embodiments disclosed are not intended to limit the invention to the particular forms disclosed. The particular implementation of the retaining device that helps retain eyeglasses on a body part may vary depending upon the particular context or application. By way of example, and not limitation, the retaining device that helps retain eyeglasses on a body part described in the foregoing were principally directed to a retaining device that joins with a frame from eyeglasses and wraps around the ears to help secure the eyeglasses during physical activity implementations; however, similar techniques may instead be applied to retaining sports goggles, such as swimming gear to the head while scuba diving, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A device comprising:
a retaining device, in which said retaining device comprises at least one of, a polymer and a fiberglass material, a unitary retaining device, wherein said unitary retaining device is configured to be operable to be attached to a portion of an eyeglass frame;
an elongate arm portion of said retaining device having a cylindrical shape configured to join with said eyeglass frame portion by wrapping around said portion of said eyeglass frame;
a slot segment disposed in said arm portion, wherein said slot segment is configured to at least partially receive said eyeglass frame portion, wherein said slot segment comprising at least one of a sliding and frictional snapping means configured to readily attach or detach said retaining device from said eyeglass frame:
a grip implement disposed in said slot segment, in which said grip implement comprises a section of rubber, wherein said section of rubber is configured to at least prevent a sliding motion of said arm portion from said eyeglass frame portion;
an extension portion, in which said extension portion comprises a hook segment, wherein said hook segment is configured to extend from said arm portion; and
wherein said hook segment is configured to be operable to partially hook around a body part, to attach said eyeglass frame to said body part, and in which said extension portion is configured to enable adornments to attach thereto.

2. The device of claim 1, in which said slot segment comprises an adhesive configured to fasten said retaining device to said eyeglass frame portion.

3. The device of claim 1, in which said unitary retaining device further comprises at least a pair of unitary retaining devices.

4. The device of claim 3, in which said unitary retaining device further comprises at least a partly polymer material and Hall partly fiberglass material.

5. The device of claim 1, in which said arm portion comprises at least a sectioned cylindrical shape, wherein said sectioned cylindrical shape partially forms said slot segment.

6. The device of claim 5, wherein said slot segment is configured to at least partially attach and detach to said frame portion through at least a slidable engagement.

7. The device of claim 1, wherein said slot segment is configured to at least partially attach to said frame portion through at least a frictional snap engagement.

8. The device of claim 1, wherein said slot segment is configured to adjustably increase in width to generally accommodate various types of eyeglass frames.

9. The device of claim 1, in which said slot segment is biased to generally form a snug fit around the eyeglass frame portion.

10. The device of claim 9, in which said arm portion comprises at least a front end section operable to be disposed towards the eyeglass.

11. The device of claim 10, in which said arm portion further comprises at least a rear end section configured to form a unitary piece with said extension portion.

12. The device of claim 1, wherein said arm portion is configured to generally form a unitary piece with said extension portion.

13. The device of claim 12, in which said extension portion comprises a length that does not exceed behind said body part.

14. The device of claim 13, in which said extension portion comprises at least an adornment.

15. The device of claim 14, wherein said adornment comprises at least a bead.

16. The device of claim 1, in which said polymer material comprises a rigid polymer material.

17. The device of claim 16, in which said unitary retaining device further comprises at least one of, a clear color and a black color.

18. The device of claim 17, in which said unitary retaining device further comprises at least a logo.

19. A device consisting essentially of:
an arm portion that is configured to wrap around a portion of a frame to attach said device to the portion of the frame, wherein said arm portion is detachable from the portion of the frame when not in use, said arm portion comprising a sectioned cylindrical shape, said arm portion further comprising a slot configured to at least partially receive said portion of the frame, said slot comprising a grip configured to secure a movement of said portion of the frame from said arm portion, said grip comprising a rubber material;
an extension portion disposed to extend from said arm portion, said extension portion configured to be operable to at least partially wraparound a user's ear, said extension portion is configured to enable adornments to attach thereto, said extension portion comprising a length that does not exceed behind said user's ear, wherein said extension portion further comprises a hook segment configured to partially hook around said user's ear to help retain said frame on said user when the frame is in use, wherein said arm portion and said extension portion is a unitary piece without the frame, and wherein the frame comprises an eyeglass frame; and
a material component, said material component comprising at least one of, a polymer and a fiberglass material, wherein said device is comprise of said material component.

* * * * *